(12) United States Patent
Baldet

(10) Patent No.: US 7,641,585 B2
(45) Date of Patent: Jan. 5, 2010

(54) REAR-DRIVE VEHICLE WITH AN ELECTRONICALLY CONTROLLED SELF-LOCKING DIFFERENTIAL

(75) Inventor: Franck Baldet, Torre Maina (IT)

(73) Assignee: Ferrari S.p.A., Modena (IT)

( * ) Notice: Subject to any disclaimer, the term of this patent is extended or adjusted under 35 U.S.C. 154(b) by 506 days.

(21) Appl. No.: 10/552,039

(22) PCT Filed: Apr. 2, 2004

(86) PCT No.: PCT/EP2004/050434

§ 371 (c)(1),
(2), (4) Date: Oct. 30, 2006

(87) PCT Pub. No.: WO2004/087453

PCT Pub. Date: Oct. 14, 2004

(65) Prior Publication Data

US 2007/0158126 A1    Jul. 12, 2007

(30) Foreign Application Priority Data

Apr. 4, 2003    (IT)    .......................... BO2003A0199

(51) Int. Cl.
*B60W 10/04*    (2006.01)
*B60W 10/12*    (2006.01)

(52) U.S. Cl. .......................................... 477/35; 475/86
(58) Field of Classification Search .................. 477/35, 477/903; 475/150, 86
See application file for complete search history.

(56) References Cited

U.S. PATENT DOCUMENTS

| 4,841,808 A * | 6/1989 | Ouchi et al. | 475/86 |
| 4,895,051 A * | 1/1990 | Weiss et al. | 475/150 |
| 5,152,362 A * | 10/1992 | Naito | 180/248 |

FOREIGN PATENT DOCUMENTS

| DE | 36 35 406 A1 | 4/1987 |
| DE | 36 37 820 A1 | 5/1987 |
| DE | 41 12 904 A1 | 10/1991 |

* cited by examiner

*Primary Examiner*—Sherry L Estremsky
*Assistant Examiner*—Edwin A. Young
(74) *Attorney, Agent, or Firm*—Birch, Stewart, Kolasch & Birch, LLP

(57) ABSTRACT

A rear-drive vehicle having a self-locking differential; a regulating device for regulating the lock percentage of the differential; a number of sensors for real-time detecting dynamic parameters of the vehicle; and a central control unit for controlling the regulating device to regulate the lock percentage of the differential as a function of the dynamic parameters of the vehicle.

23 Claims, 4 Drawing Sheets

REAR-DRIVE VEHICLE WITH AN ELECTRONICALLY CONTROLLED SELF-LOCKING DIFFERENTIAL

TECHNICAL FIELD

The present invention relates to a rear-drive vehicle with a self-locking differential.

BACKGROUND ART

At present, high-performance road sports cars are normally rear-drive, and have a self-locking differential for increasing the drive torque transmitted by the rear wheels to the road surface.

Tests have shown, however, that currently marketed self-locking differentials do not always succeed in maximizing the drive torque transmitted by the rear wheels to the road surface. What is more, the presence of the self-locking differential makes the vehicle harder and less safe to drive, in that, should one of the rear wheels temporarily lose grip, the self-locking differential almost immediately transfers part of the drive torque to the other rear wheel, thus possibly resulting in rear-end swerving of the vehicle, which must be skilfully counteracted by the driver acting promptly on the vehicle controls to prevent the vehicle spinning.

U.S. Pat. No. 4,741,407 discloses a system for controlling limited-slip differential gear unit for automotive vehicle. The control system for the limited-slip differential gear unit is associated with a suspension control system to receive therefrom a suspension mode indicative signal to select one of a plurality of preset characteristics to derive a slip-limit control signal; the limited-slip differential gear unit includes a slip-limit adjusting mechanism which is responsive to the control signal for adjusting the slip-limitation to be generated by the limited-slip differential gear unit.

U.S. Pat. No. 5,152,362 discloses a driving torque distribution control system for vehicle; the control system comprises a clutch for limiting a differential action between left and right drive wheels or varying a driving torque distribution between front and rear axles of a 4WD vehicle, a sensor group, and a controller for controlling an engagement force of the clutch to control the differential limiting force or the torque distribution between the front and rear drive wheels. The sensor group includes an accelerator position sensor and a lateral acceleration sensor; the controller increases the clutch engagement force as the speed of increase of the accelerator opening degree increases, and increases the rate of increase of the clutch engagement force with respect to the increasing speed of the accelerator opening degree when the lateral acceleration increases.

DISCLOSURE OF INVENTION

It is an object of the present invention to provide a rear-drive vehicle featuring a self-locking differential, being cheap and easy to produce, and, at the same time, eliminating the aforementioned drawbacks.

According to the present invention, there is provided a rear-drive vehicle featuring a self-locking differential, as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
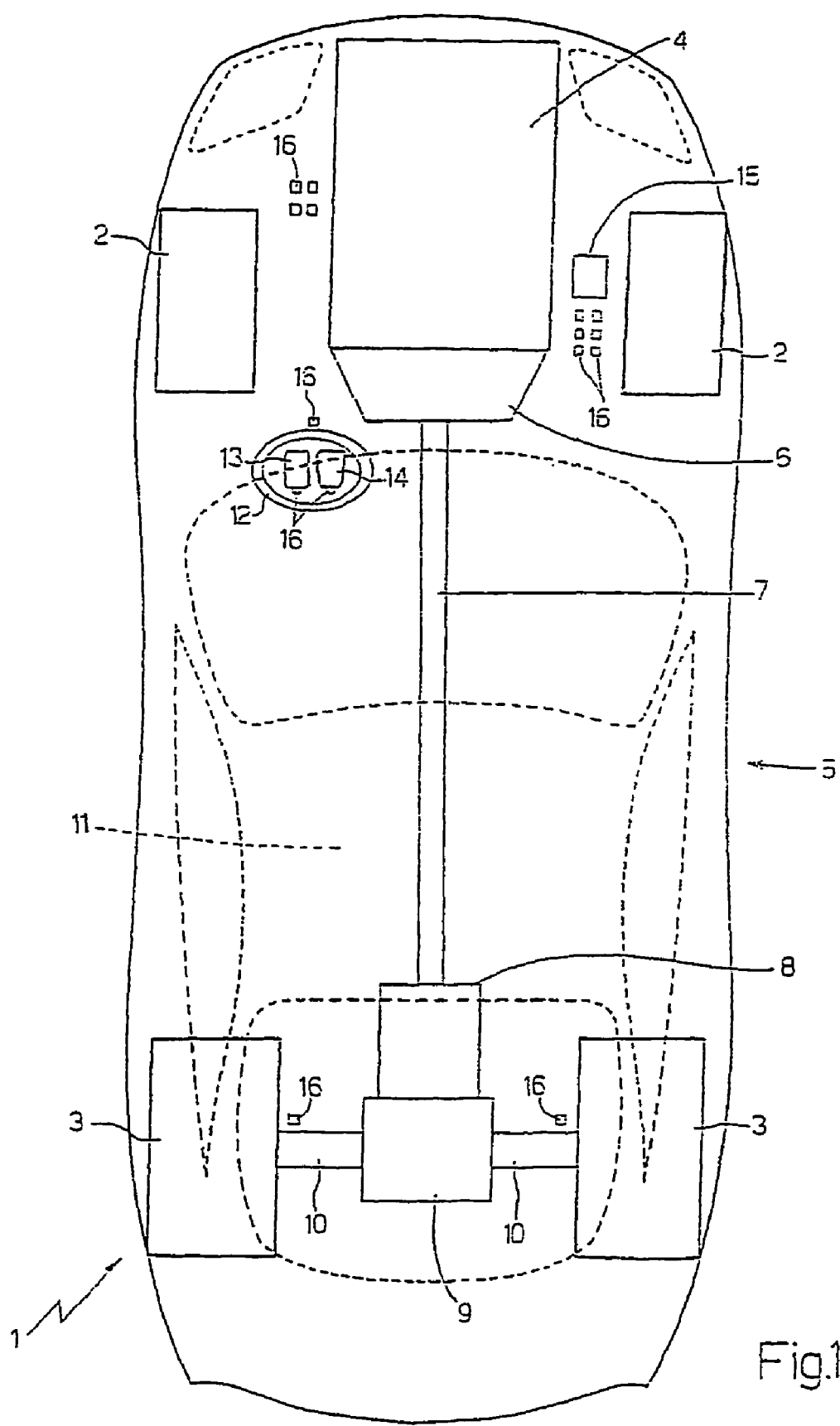
FIG. 1 shows a schematic plan view of a rear-drive vehicle in accordance with the present invention.

Number 1 in FIG. 1 indicates a vehicle having two front wheels 2 and two rear drive wheels 3, and comprising a front internal combustion engine 4 producing a drive torque Tm which is transmitted to rear drive wheels 3 by a power train 5. Power train 5 comprises a clutch 6 housed in a casing integral with engine 4 and for connecting the drive shaft of engine 4 to a propeller shaft 7 terminating in a mechanical gearbox 8 at the rear; and a self-locking differential 9 is cascade-connected to gearbox 8, and from which extend two axle shafts 10, each integral with a respective rear drive wheel 3.

The passenger compartment 11 of vehicle 1 houses a steering wheel 12 for imparting a turning angle Dvol to front wheels 2; a brake pedal 13 controlling a braking system to generate a braking torque on wheels 2 and 3; and an accelerator pedal 14 for regulating the drive torque Tm generated by engine 4.

Vehicle 1 comprises a central control unit 15 connected to a number of sensors 16 distributed inside vehicle 1 to real-time detect respective parameters of vehicle 1, such as the travelling speed V of vehicle 1, the turning angle Dvol of vehicle 1, the yaw speed Psip of vehicle 1, the lateral acceleration Ay of vehicle 1, the longitudinal acceleration Ax of vehicle 1, the rotation speed WrearL, WrearR of each rear drive wheel 3, the position Pacc of accelerator pedal 14, the position Pbra of brake pedal 13, and the drive torque Tm generated by engine 4. Central control unit 15 may obviously be defined by a number of physically separate processing units connected to one another, for example, by a data BUS; and, as opposed to a physical sensor 16, an estimation algorithm may be implemented by central control unit 15 to determine one or more parameters of vehicle 1.

Figure 2:
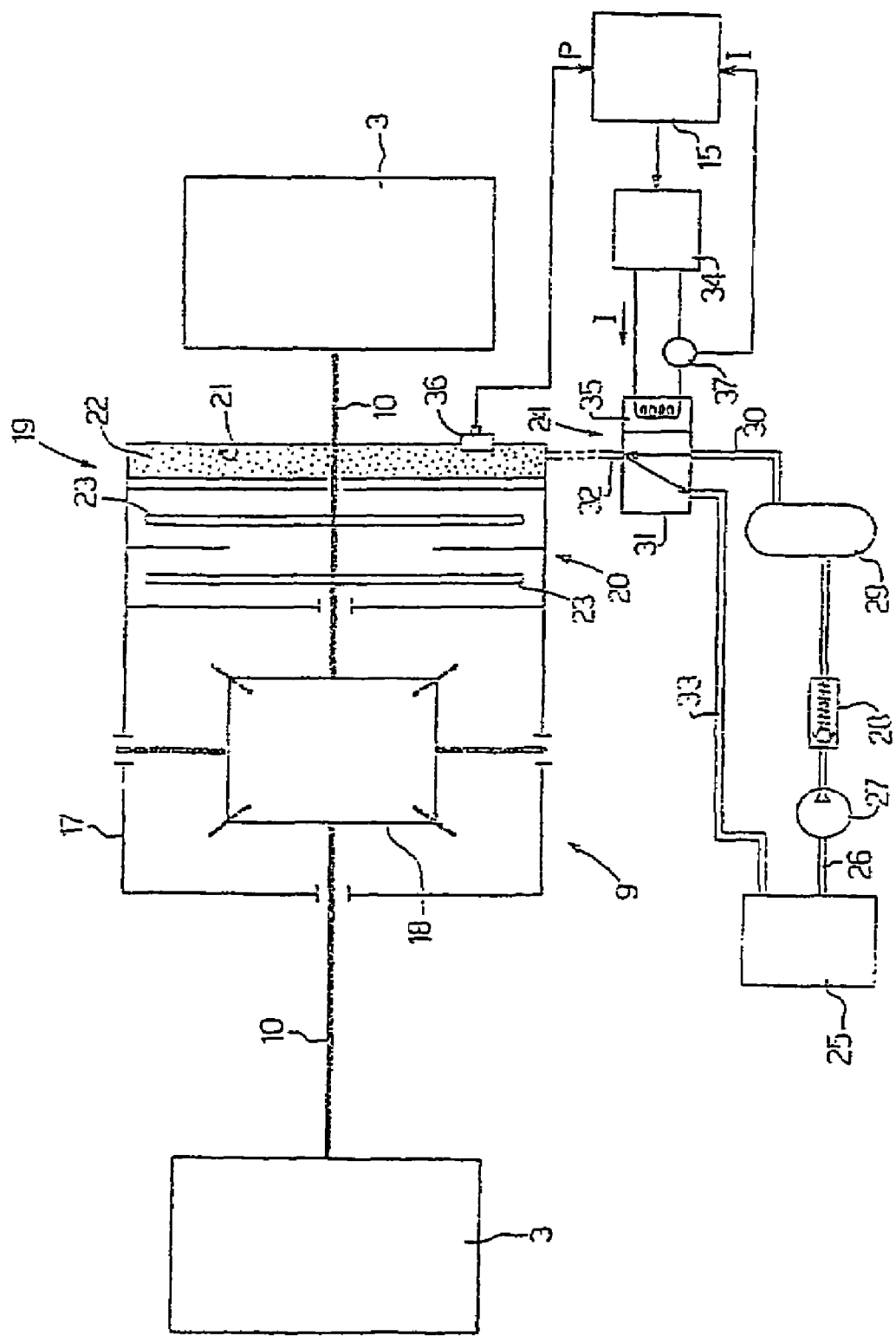
FIG. 2 shows an operating diagram of a self-locking differential of the FIG. 1 vehicle.

As shown in FIG. 2, self-locking differential 9 comprises a box body 17; a bevel gear pair 18 housed inside box body 17, and which transmits drive torque Tm to the two rear drive wheels 3 via respective axle shafts 10; and a lock device 19 for partly locking one axle shaft 10 with respect to box body 17. More specifically, lock device 19 comprises a clutch 20 having a thrust chamber 21 filled with pressurized oil 22, and a number of disks 23 integral with one of axle shafts 10. When thrust chamber 21 is filled with pressurized oil 22, disks 23 are subjected to axial thrust substantially proportional to the pressure P of oil 22 inside thrust chamber 21.

Lock device 19 of differential 9 is connected to a regulating device 24 for regulating the lock percentage % L of differential 9 between zero and a maximum value (e.g. 50%) by regulating the pressure P of oil 22 inside thrust chamber 21. In actual use, central control unit 15 commands regulating device 24 to regulate the lock percentage % L of differential 9 as a function of the dynamic parameters of vehicle 1.

Regulating device 24 comprises a tank 25 of oil 22 at atmospheric pressure, from which extends a pipe 26 fitted with a pump 27 and a non-return valve 28 to feed pressurized oil 22 to a hydraulic accumulator 29; and hydraulic accumulator 29 communicates along a pipe 30 with an inlet of a proportional solenoid valve 31, from which extend a pipe 32 terminating inside thrust chamber 21, and a pipe 33 terminating in tank 25. In actual use, solenoid valve 31 keeps thrust chamber 21 isolated from tank 25 to maintain a constant pressure P of oil 22 inside thrust chamber 21, connects thrust chamber 21 to tank 25 to reduce the pressure P of oil 22 inside thrust chamber 21, and connects thrust chamber 21 to hydraulic accumulator 29 to increase the pressure P of oil 22 inside thrust chamber 21.

Solenoid valve 31 is driven by a power supply 34 controlled by central control unit 15 to supply a variable voltage to the terminals of a control coil 35 of solenoid valve 31 so that an electric current I circulates through control coil 35. To ensure solenoid valve 31 is activated correctly, regulating device 24 comprises a sensor 36 for detecting the value of pressure P of oil 22 inside thrust chamber 21, and a sensor 37 for detecting the value of current I circulating through control coil 35 of solenoid valve 31.

Figure 3:
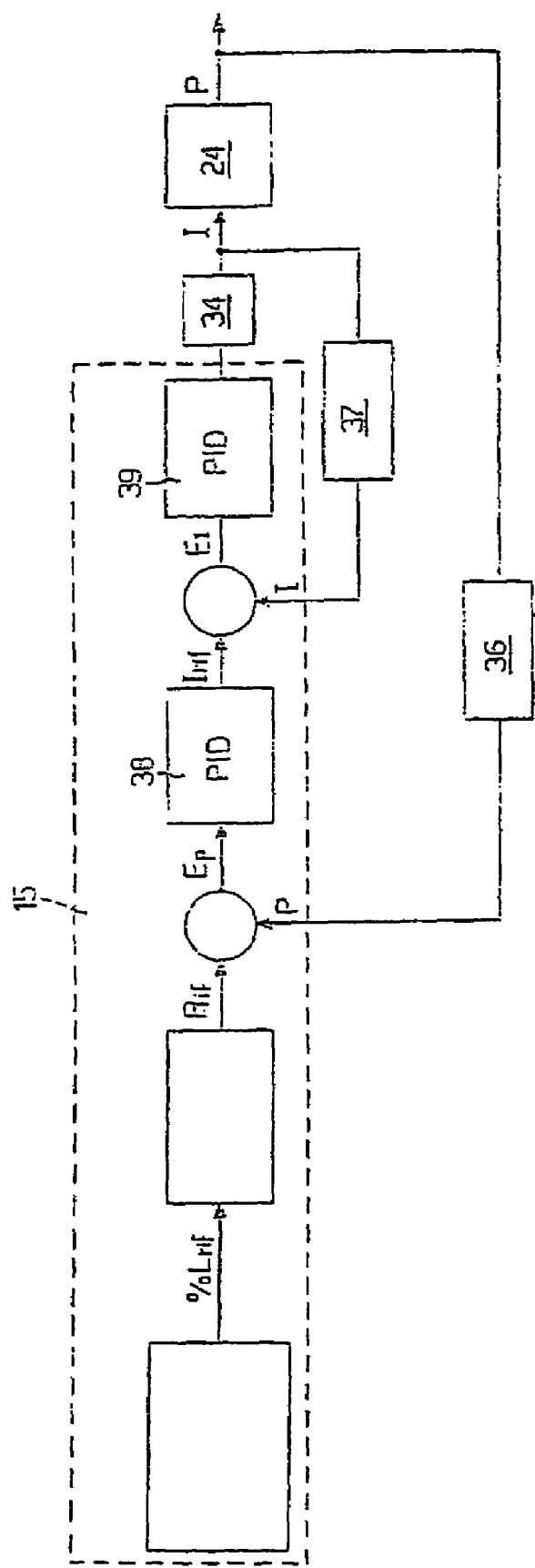
FIG. 3 shows a control method implemented by a central control unit of the FIG. 1 vehicle.

In actual use, central control unit 15 controls regulating device 24 by controlling power supply 34 to regulate the pressure P of oil 22 inside thrust chamber 21 as described above, and so regulate the axial thrust exerted on disks 23 of clutch 20 and, hence, the lock percentage % L of differential 9. As shown in FIG. 3, a target value % Lrif of the lock percentage of differential 9 is established in central control unit 15 as described later on, and is translated into an equivalent target value Prif of pressure P of oil 22 inside thrust chamber 21; target value Prif is compared with the actual value of pressure P, measured by sensor 36, to generate a pressure error $E_p$, from which a target value Irif of the current I circulating through coil 35 is determined by a PID regulator 38. Target value Irif is compared with the actual value of current I, measured by sensor 37, to generate a current error $E_I$ which is used by a PID regulator 39 to control power supply 34. In other words, central control unit 15 controls the value of pressure P of oil 22 inside thrust chamber 21 by means of a first control loop employing as a feedback variable the value of pressure P of oil 22 inside thrust chamber 21, and a second control loop within the first control loop and employing as a feedback variable the value of current I circulating through coil 35 of solenoid valve 31.

An alternative embodiment comprises two torque sensors 16, each connected to central control unit 15 and fitted to a respective axle shaft 10 to real-time detect the value of the torque transmitted by self-locking differential 9 to respective rear wheel 3 via relative axle shaft 10. Each torque sensor 16 is preferably electromagnetic, and measures the torsional deformation of respective axle shaft 10 electromagnetically to determine the value of the torque transmitted by axle shaft 10 to relative rear wheel 3.

Central control unit 15 controls regulating device 24 to regulate the lock percentage % L of differential 9 as a function of the value of the torque transmitted by self-locking differential 9 to each rear wheel 3. More specifically, central control unit 15 predicts time changes in the angular rotation speed of each rear wheel 3, using the value of the torque transmitted by respective axle shaft 10, and controls regulating device 24 to regulate the lock percentage % L of differential 9 as a function of future time changes in the angular rotation speed of each rear wheel 3.

Central control unit 15 has the advantage of estimating a target value of the lock percentage % L of differential 9 as a function of the dynamic parameters of vehicle 1, of estimating a target value of the torque transmitted by each axle shaft 10 as a function of the target value of lock percentage % L of differential 9, and of controlling regulating device 24 by means of a feedback control loop employing as a feedback variable the value of the torque transmitted to each rear wheel 3. Obviously, the control loop of the torque value may contain a control loop of the value of pressure P of oil 22 inside thrust chamber 21 and/or a control loop of the value of current I circulating through coil 35.

Figure 4:
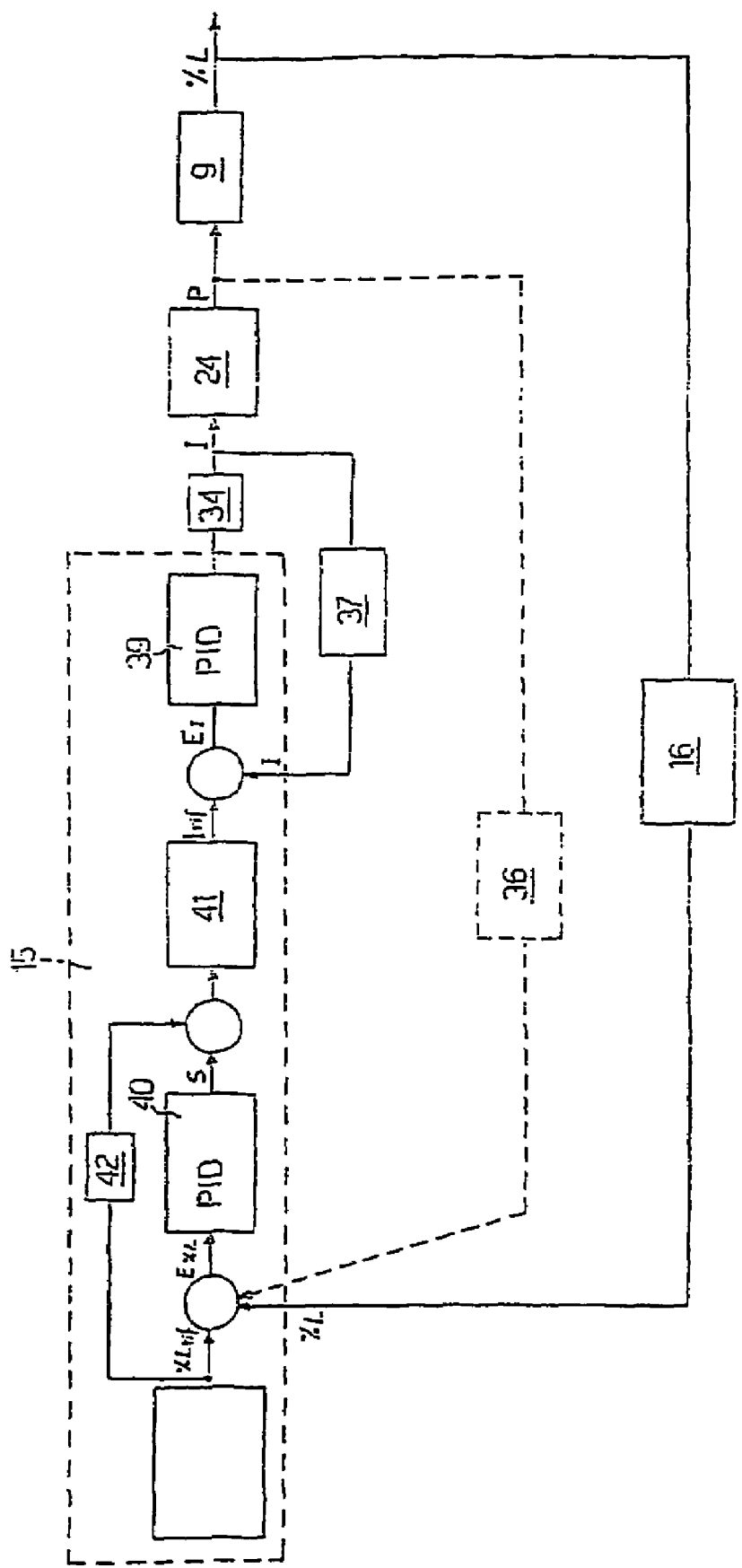
FIG. 4 shows a further control method implemented by a central control unit of the FIG. 1 vehicle.

More specifically, as shown in FIG. 4, the target value % Lrif of the lock percentage of differential 9 is established in central control unit 15 as described later on, and is compared with the actual value of lock percentage % L of differential 9, measured by torque sensors 16 fitted to axle shafts 10, to generate an error $E_{\%L}$ of lock percentage. A control signal S is obtained from lock percentage error $E_{\%L}$ by a PID regulator 40, and is supplied to a control block 41 to determine a corresponding target value Irif of the current I circulating through coil 35. Target value Irif is compared with the actual value of current I, measured by sensor 37, to generate a current error $E_I$ which is used by PID regulator 39 to control power supply 34. In a preferred embodiment, to the control signal S supplied by PID regulator 40 is added a further contribution, which depends directly on target value % Lrif of the lock percentage of differential 9, and is supplied by a computing block 42 implementing an inverse model. In other words, the signal supplied to control block 41 depends on both the error in the value of lock percentage % L of differential 9 (closed-loop feedback control) and on the target value % Lrif of the lock percentage of differential 9 (direct open-loop control). This solution is employed to increase overall control response speed.

In other words, central control unit 15 controls the lock percentage % L of differential 9 by means of a first control loop employing the value of lock percentage % L of differential 9 as a feedback variable, and a second control loop within the first control loop and employing as a feedback variable the value of current I circulating through coil 35 of solenoid valve 31.

As vehicle 1 is running, central control unit 15 determines the target value of the lock percentage % L of differential 9 as a function of the dynamic parameters of vehicle 1, the position Pacc of accelerator pedal 14, the position Pbra of brake pedal 13, the drive torque Tm, the gear engaged, and intervention of any other electronic devices on vehicle 1 (e.g. ABS, ASR and ESP). For example, the dynamic parameters of vehicle 1 employed by central control unit 15 to determine the target value of the lock percentage % L of differential 9 may be; the travelling speed V of vehicle 1, the turning angle Dvol of vehicle 1, the yaw speed Psip of vehicle 1, lateral acceleration Ay of vehicle 1, longitudinal acceleration Ax of vehicle 1, and the rotation speed WrearL, WrearR of each rear drive wheel 3. To determine the target value of the lock percentage % L of differential 9, central control unit 15 may also take into account the driving mode (normal, sport, low-grip) selected by the driver of vehicle 1.

When driving along a substantially straight route, central control unit 15 zeroes the lock percentage % L of differential 9 in normal driving mode, and gradually increases the lock percentage % L of differential 9 in sport mode. In addition to the mode settings made by the driver, the discriminating factor between normal and sport mode may be defined by the position Pacc of accelerator pedal 14, the longitudinal acceleration Ax value of vehicle 1, and/or the speed V value of vehicle 1.

When cornering, central control unit 15 gradually increases the lock percentage % L of differential 9 if accelerator pedal 14 is released, to stabilize vehicle 1.

When cornering, central control unit 15 gradually reduces the lock percentage % L of differential 9 if accelerator pedal 14 is pressed (sharply), to maximize both stability and cornering acceleration performance of vehicle 1. More specifically, the reduction in the lock percentage % L of differential 9 is proportional to the lateral acceleration Ay of vehicle 1, the speed V of vehicle 1, the drive torque Tm of engine 4, and/or the gear engaged. In this condition, central control unit 15 may also reduce the drive torque Tm of engine 4 to limit the power oversteering effect.

When cornering at substantially steady speed, central control unit 15 estimates the road grip of wheels 2, 3, and accordingly zeroes the lock percentage % L of differential 9 when the road grip of wheels 2, 3 is far from the grip limit, gradually increases the lock percentage % L of differential 9 when the road grip of wheels 2, 3 nears the grip limit, and reduces the lock percentage % L of differential 9 to zero when the road grip of wheels 2, 3 is almost at the grip limit. As the road grip of wheels 2, 3 nears the grip limit, central control unit 15 preferably increases the lock percentage % L of differential 9 gradually in proportion to the value of lateral acceleration Ay of vehicle 1 and the value of speed V of vehicle 1.

The road grip of wheels 2, 3 is estimated as a function of the value of turning angle Dvol of vehicle 1 and the value of lateral acceleration Ay of vehicle 1. More specifically, central control unit 15 zeroes the lock percentage % L of differential 9 when the value of turning angle Dvol of vehicle 1 is substantially directly proportional to the value of lateral acceleration Ay of vehicle 1, and gradually increases the lock percentage % L of differential 9 when no substantially direct proportion relationship exists between the value of turning angle Dvol of vehicle 1 and the value of lateral acceleration Ay of vehicle 1.

Operating as described above when cornering at substantially steady speed, understeering of vehicle 1 is eliminated when the road grip of wheels 2, 3 is far from the grip limit (linear relationship between turning angle Dvol and lateral acceleration Ay), vehicle 1 is slightly oversteered when the road grip of wheels 2, 3 nears the grip limit, and vehicle 1 is understeered (i.e. performs more safely and predictably) when the road grip of wheels 2, 3 is almost at the grip limit.

Tests have shown that regulating device 24, as described above, for regulating the lock percentage % L of differential 9 provides for improving performance, directional stability, active safety (even at the grip limit), and driving pleasure.

The invention claimed is:

1. A rear-drive vehicle comprising:
    a self-locking differential;
    an engine producing a drive torque (Tm) which is transmitted to the rear drive wheels by the self-locking differential;
    an accelerator pedal which modulates the drive torque (Tm) generated by the engine;
    a brake pedal which modulates a brake torque acting on the vehicle;
    a number of sensors for real-time detecting respective dynamic parameters of the vehicle;
    a regulating device for regulating the lock percentage (% L) of the differential; and
    a central control unit for controlling the regulating device to regulate the lock percentage (% L) of the differential as a function of the dynamic parameters of the vehicle;
    the vehicle is characterized in that when cornering the central control unit reduces the lock percentage (% L) of the differential when the accelerator pedal is pressed and increases the lock percentage (% L) of the differential when the accelerator pedal is released.

2. A vehicle as claimed in claim 1, wherein the self-locking differential comprises a box body; a bevel gear pair housed in the box body, and which transmits the drive torque (Tm) to the two rear drive wheels by means of respective axle shafts; and a lock device for partly locking one axle shaft with respect to the box body; the lock device comprising a clutch in turn having a number of disks integral with one of the axle shafts, and a thrust chamber filled with a fluid under pressure (P) to exert variable axial thrust on the disks.

3. A vehicle as claimed in claim 2, wherein the regulating device regulates the pressure (P) of the fluid inside the thrust chamber.

4. A vehicle as claimed in claim 3, wherein the regulating device comprises a solenoid valve for selectively connecting the thrust chamber to a tank into which the fluid is drained, or to a tank for supplying the fluid under pressure (P).

5. A vehicle as claimed in claim 4, wherein the central control unit estimates a target value of the lock percentage (% L) of the differential as a function of the dynamic parameters of the vehicle, estimates a target value (Prif) of the pressure (P) of the fluid inside the thrust chamber as a function of the target value of the lock percentage (% L) of the differential, and controls the solenoid valve to apply inside the thrust chamber the target value (Prif) of the pressure (P) of the fluid.

6. A vehicle as claimed in claim 5, wherein the regulating device comprises a first sensor for detecting the value of the pressure (P) of the fluid inside the thrust chamber, and a second sensor for detecting the value of the current (I) circulating through the solenoid valve; the central control unit controlling the value of the pressure (P) of the fluid inside the thrust chamber by means of a first control loop employing as a feedback variable the value of the pressure (P) of the fluid inside the thrust chamber, and a second control loop within the first control loop and employing as a feedback variable the value of the current (I) circulating through the solenoid valve.

7. A vehicle as claimed in claim 1, wherein the central control unit controls the regulating device to regulate the lock percentage (% L) of the differential as a function of the travelling speed (V) of the vehicle, the turning angle (Dvol) of the vehicle, the yaw speed (Psip) of the vehicle, the lateral acceleration (Ay) of the vehicle, the longitudinal acceleration (Ax) of the vehicle, the rotation speed (WrearL, WrearR) of each rear drive wheel, the position (Pacc) of the accelerator pedal, the position (Pbra) of the brake pedal, and the drive torque (Tm).

8. A vehicle as claimed in claim 1, wherein the reduction in the lock percentage (% L) of the differential is proportional to the lateral acceleration (Ay) of the vehicle, the speed (V) of the vehicle, and the drive torque (Tm) of the engine.

9. A vehicle as claimed in claim 1, wherein the central control unit reduces the drive torque (Tm) of the engine to limit the power oversteering effect.

10. A vehicle as claimed in claim 1, wherein, when cornering at substantially steady speed, the central control unit estimates the road grip of the wheels, zeroes the lock percentage (% L) of the differential when the road grip of the wheels is far from the grip limit, and gradually increases the lock percentage (% L) of the differential when the road grip of the wheels nears the grip limit.

11. A vehicle as claimed in claim 10, wherein the central control unit reduces the lock percentage (% L) of the differential to zero when the road grip of the wheels is almost at the grip limit.

12. A vehicle as claimed in claim 10, wherein, as the road grip of the wheels nears the grip limit, the central control unit gradually increases the lock percentage (% L) of the differential in proportion to the value of the lateral acceleration (Ay) of the vehicle and the value of the speed (V) of the vehicle.

13. A vehicle as claimed in claim 10, wherein the central control unit zeroes the lock percentage (% L) of the differential when the value of the turning angle (Dvol) of the vehicle is substantially directly proportional to the value of the lateral acceleration (Ay) of the vehicle, and gradually increases the lock percentage (% L) of the differential when no substantially direct proportion relationship exists between the value of the turning angle (Dvol) of the vehicle and the value of the lateral acceleration (Ay) of the vehicle.

14. A vehicle as claimed in claim 10, wherein the central control unit estimates the road grip of the wheels by estimating the value of the lateral acceleration (Ay) of the vehicle.

15. A vehicle as claimed in claim 10, wherein the central control unit estimates the road grip of the wheels by estimating the value of the turning angle (Dvol) of the vehicle and value of the lateral acceleration (Ay) of the vehicle.

16. A vehicle as claimed in claim 1, wherein, when driving along a substantially straight route, the central control unit zeroes the lock percentage (% L) of the differential in normal driving mode, and gradually increases the lock percentage (% L) of the differential in sport driving mode.

17. A vehicle as claimed in claim 1, and comprising two axle shafts, each connecting the self-locking differential mechanically to a respective rear wheel; and two torque sensors, each of which is connected to the central control unit, is fitted to a respective axle shaft, and real-time detects the value of the torque transmitted by the self-locking differential to the respective rear wheel via the relative axle shaft; the central control unit controlling the regulating device to regulate the lock percentage (% L) of the differential as a function of the value of the torque transmitted by the self-locking differential to each rear wheel.

18. A vehicle as claimed in claim 17, wherein each torque sensor is electromagnetic, and measures electromagnetically the torsional deformation of the respective axle shaft to determine the value of the torque transmitted by the axle shaft to the relative rear wheel.

19. A vehicle as claimed in claim 17, wherein the central control unit predicts time changes in the angular rotation speed of each rear wheel, using the value of the torque transmitted by respective axle shaft, and controls the regulating device to regulate the lock percentage (% L) of the differential as a function of future time changes in the angular rotation speed of each rear wheel.

20. A vehicle as claimed in claim 17, wherein the central control unit estimates a target value of the lock percentage (% L) of the differential as a function of the dynamic parameters of the vehicle, and controls the regulating device by means of a feedback control loop employing as a feedback variable the value of the lock percentage (% L) of the differential.

21. A vehicle as claimed in claim 20, wherein the regulating device comprises a solenoid valve controlled to vary the lock percentage (% L) of the differential, and a second sensor for detecting the value of the current (I) circulating through the solenoid valve; the central control unit controlling the regulating device by means of a first control loop employing the value of the lock percentage (% L) of the differential as a feedback variable, and a second control loop within the first control loop and employing as a feedback variable the value of the current (I) circulating through the solenoid valve.

22. A vehicle as claimed in claim 17, wherein the central control unit estimates a target value of the lock percentage (% L) of the differential as a function of the dynamic parameters of the vehicle, and controls the regulating device by adding a feedback control loop employing the value of the lock percentage (% L) of the differential as a feedback variable, and a direct open control loop employing the target value of the lock percentage (% L) of the differential as a control variable.

23. A vehicle as claimed in claim 22, wherein the regulating device comprises a solenoid valve controlled to vary the lock percentage (% L) of the differential, and a second sensor for detecting the value of the current (I) circulating through the solenoid valve; the central control unit controlling the regulating device by means of a first control loop employing the value of the lock percentage (% L) of the differential as a feedback variable, and a second control loop within the first control loop and employing as a feedback variable the value of the current (I) circulating through the solenoid valve.

* * * * *